3,675,984

Filed May 17, 1971

Inventors:
Jacques Claude Vulmiere
and
Huguette Nelly Vulmiere
BY Baldwin Wight & Brown
Attorneys

United States Patent Office 3,675,984
Patented July 11, 1972

3,675,984
CONTACT ENDOSCOPE WITH STRAY LIGHT TRAP
Jacques Claude Vulmiere and Huguette Nelly Vulmiere, Paris, France, assignors to Etablissement Public: Agence Nationale de Valorisation de la Recherche (Anvar) Tour Aurore
Filed May 17, 1971, Ser. No. 144,049
Claims priority, application France, May 27, 1970, 7019264
Int. Cl. G02b 5/14
U.S. Cl. 350—96 R                6 Claims

ABSTRACT OF THE DISCLOSURE

The invention refers to improvements to contact endoscopes. The invention purpose is to provide a contact endoscope featuring a cylindrical hollow light collecting member made of transparent material and having smooth internal and frosted external surfaces, a sight (4) fastened at one of the cylindrical collector (1) extremities and a light guide (3) located co-axially to the other extremity of said collector and having a viewing distal face, this endoscope being characterized in that an optical unit (31 to 36) acting as a stray light trap, is located inside the cylindrical collector (1). The invention applies to direct inspection through endoscopes.

---

The present invention refers to contact endoscopes, i.e., instruments intended for medical or industrial applications, and which allows the observation of objects in contact with or adjacent to their terminal extremity, either by direct vision (overhaul of mucous membrances, for example) or by lateral vision (inspection of bore walls).

The principle of these endoscopes is based essentially on the properties of "light guides" and more particularly on those described in the French Pat. No. 1,113,164. The main part of the endoscope acting as well as light guide and thick magnifying-glass is a rod cut into an optical-quality material, transparent into the spectral range used for lighting the observation field: glass, for example, will be convenient in case of a visible-light lighting and silica in case of an ultra-violet lighting.

The present invention refers more particularly to endoscopes having a collector made of an hollow cylinder made of transparent material whose external surface is preferably polished for an easier cleaning, and whose internal surface is preferably frosted for allowing ambient light to enter the endoscope under a very wide angle.

Many applications of these endoscopes have been contemplated, but they were not always possible, namely in view of the defects due to lighting through self-collimation, in particular reflections and stray light which blur the image contrasts.

A first object of the invention is to suppress these drawbacks by improving the conditions of visual and photographic observation by suppressing the said reflections and stray light.

Another object of the invention, is, through suppression of these faults, to allow the direct comparative study in the fields respectively of colorimetry and surface conditions.

A further object of the invention is to improve lateral vision into endoscopes specially equipped to this end by decreasing moreover certain reflections which appear at the very level of the terminal face.

To these ends, the invention concerns a contact endoscope of the type comprising a light collecting cylindrical hollow body, made of a transparent material, with smooth external and frosted internal surfaces, a sight provided at one of the extremities of the cylindrical collector and a light guide located co-axially to the other extremity of the said collector and having a terminal viewing face, this endoscope being characterized in that it has inside the cylindrical collector an optical unit working as a stray or parasitic light trap and consisting, on the one side, of two chambers co-axial to the light guide, the first one being essentially cylindrical and having an absorbing wall, being limited at its proximal extremity by the said sight, and at its distal extremity by a first diaphragm whose diameter matches that of the conical beam issued from the light guide diaphragmed by the sight, and the second chamber having the shape of a truncated cone, and a weakly reflecting wall, being located between the light guide and the first chamber, and limited at its proximal extremity by the said first diaphragm and at its distal extremity by a second diaphragm whose diameter is greater than that of the first diaphragm, this diameter as well as the distance from the second diaphragm to the proximal face of the light guide being defined in order to obtain the maximum illumination of the said proximal face by the light collector while preventing the direct rays issued by the collector to enter the said first chamber, and on the other side, of a diffusing truncated-cone shaped wall whose conicity is inversed relatively to that of the said second chamber, co-axial to the light guide and connecting the said second diaphragm to the collector, and finally of a spherical concave mirror of low reflection factor, co-axial to the light guide, and limiting the internal wall of the collector extremity between this latter and the proximal face of the light guide.

With such an arrangement, the only beams reflected to the objective lens are stray or parasitic beams whose original brightness, or luminance, has been strongly reduced by reflection on a very slight reflecting surface, while the highest number of light rays can be collected and directed to the light guide.

In case of applications to colorimetry or to inspection or control of surface conditions, the endoscope presents, on its front or lateral viewing distal face color samples or surface condition samples directly fitted on a part of the said viewing face.

It is thus possible by this means, and thanks to the stray light trap built into the endoscope, to compare under identical illumination and inspection conditions, the external appearance of the observed field with that of field considered as an ideal one.

In case of lateral vision, the endoscope comprises a light guide whose terminal face is flat and consists of a flat facet, either parallel with the light guide axis, or slightly inclined to this axis, the bevelled extremity of the guide being then cut so that light rays striking perpendicularly the said facet be reflected in parallel direction with the guide axis, while the portions of the cylindrical surface of the guide located between the facet and the bevel extremity are frosted.

Other characteristics and advantages of the invention will appear from the following description of different embodiments of the hereabove endoscope, this description being given only as a non-limiting example and in reference with the appended drawings, where:

FIG. 1 is a sectional view of a contact endoscope of known type.

FIG. 2 schematically illustrates the areas limited by different light beams issued from the endoscope according to FIG. 1.

Figure 1:
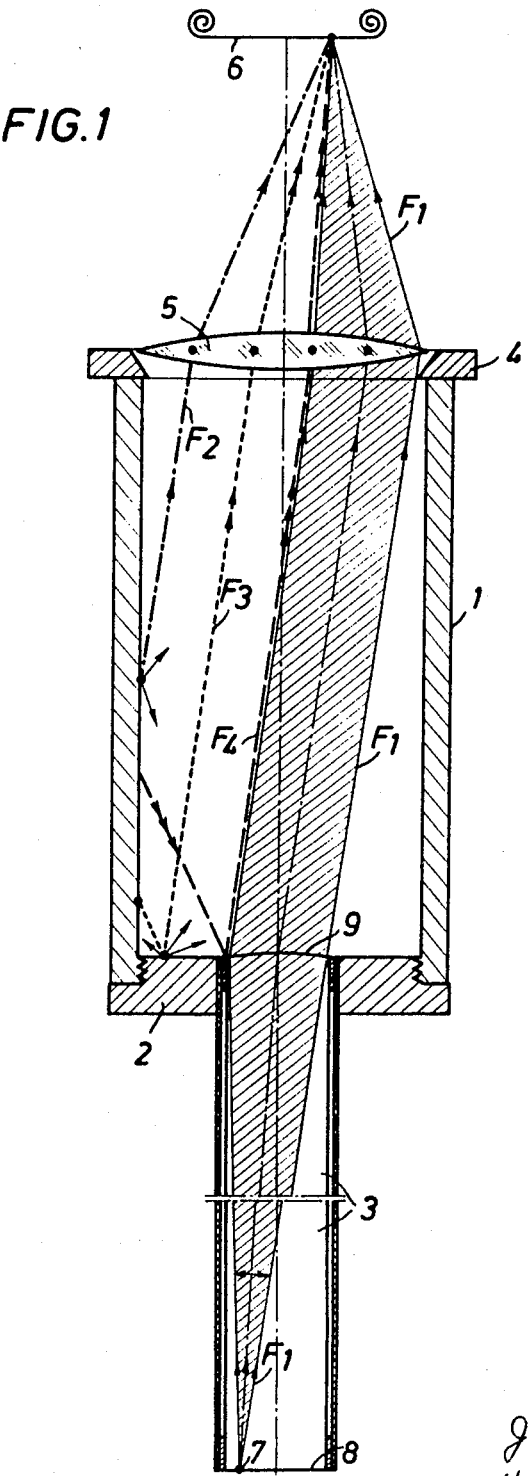
FIG. 1 shows an axial section of a direct vision endoscope of known type equipped for photography. This endoscope comprises an hollow cylindrical body or collector 1, made of a transparent material and whose external and internal surfaces are preferably respectively smooth and frosted.

The distal extremity of collector 1 is closed by plug 2 screwed on collector 1 and into which is fitted the light guide 3.

A sight 4 is fastened at the proximal extremity of the collector 1, this sight surrounding an objective lens 5 located before a photo-sensitive plate 6 of a photographic camera centered to the endoscope axis. We will consider the light beam in return $F_1$ issued from a point 7 of the distal face 8 of the light guide 3 and collimated by the diaphram consisting of the proximal face 9 of the light guide 3.

This face 9 is made convex so that rays issuing from the guide 3 and passing the cavity of collector 1 be parallel.

Figure 2:
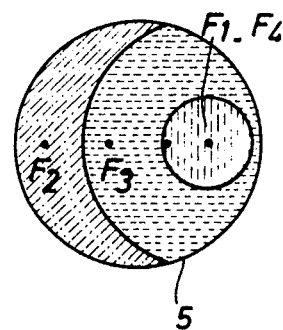

The beam $F_1$ strikes the objective 5 in a circular area also referred to as $F_1$ in FIG. 2, and then converges to the photographic plate 6. In such a device, different stray light beams fairly disturb the sharpness of the photographic image.

Among these beams, one of them, $F_2$, issues directly from the diffusing internal wall of collector 1. This beam $F_2$, represented by dot-and-dash lines in FIG. 1, covers the crescent-shaped area called $F_2$ of objective 5 (FIG. 2).

Another stray beam, $F_3$ results from the reflection on the internal wall of the plug 2 of light rays issuing from collector 1. This beam $F_3$, illustrated by short-dashed lines, covers on the objective 5 (FIG. 2) an area $F_3$ which surrounds the area $F_1$.

A third stray beam $F_4$, illustrated by long-dashed lines on the FIG. 1, issuing from the reflection on the proximal face of the guide 3, is superimposed to beam $F_1$.

The purpose of the present invention is therefore primarily to strongly reduce, if not to completely eliminate the disturbances due to stray beams $F_2$, $F_3$ and $F_4$.

Figure 3:
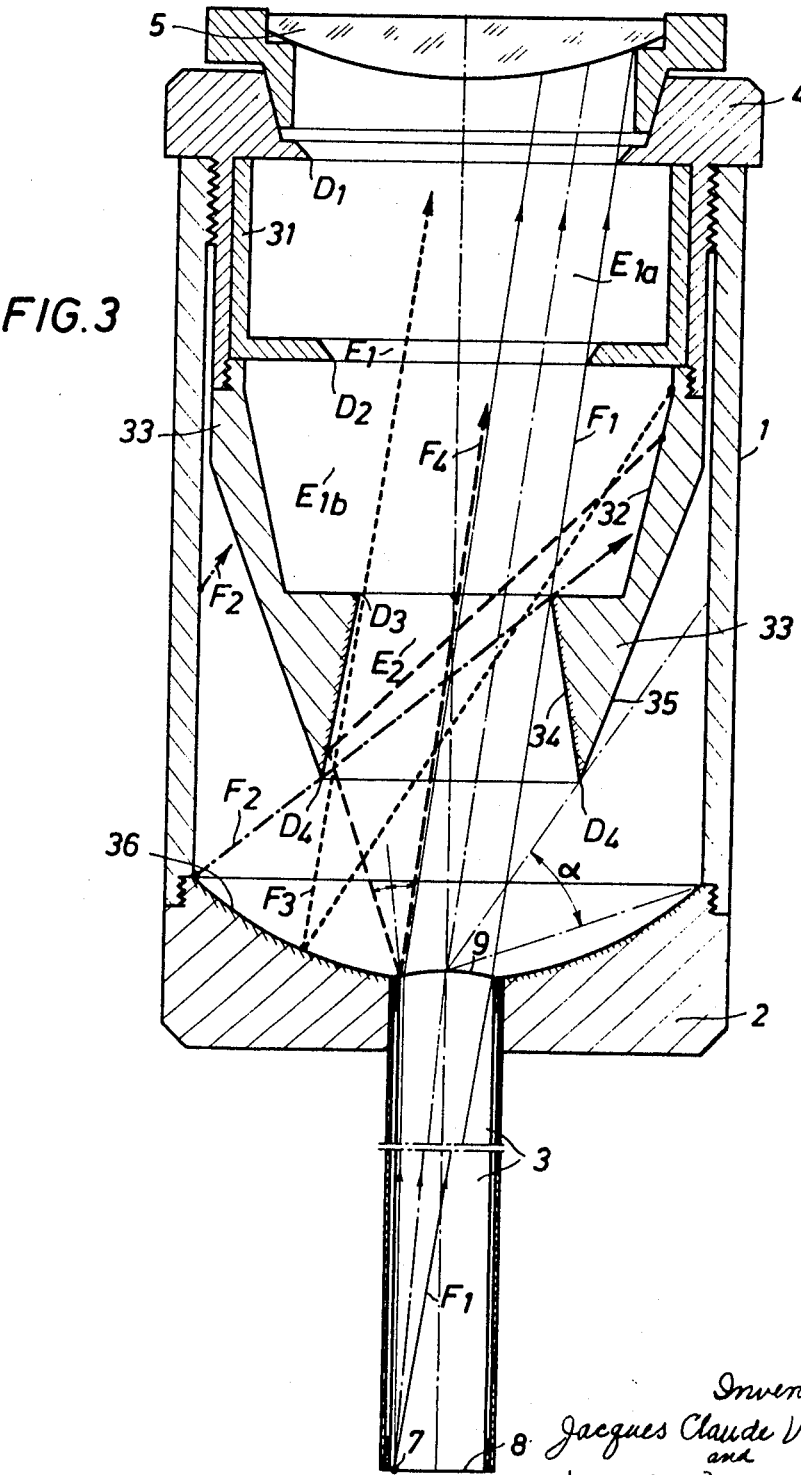
FIG. 3 represents an axial section of an endoscope according to the invention.

To this end, a light trap represented in the FIG. 3 in axial section is built into the endoscope.

In endoscopes from FIGS. 1 and 3, identical references are given to homologous elements.

The said light trap consists of two chambers $E_1$ and $E_2$, co-axial to collector 1.

The chamber $E_1$ is located between the sight 4 and the chamber $E_2$, and is divided into two co-axial sections $E_1a$ and $E_2b$.

The chamber $E_1a$ is limited by a tubular sleeve 31, by a first diaphragm $D_1$ made of the sight 4 and by a second diaphragm $D_2$ made of the sleeve 31.

The chamber $E_1b$ is limited by the internal wall in truncated cone shape 32 of a sleeve 33 integral with the sight 4, by the second diaphragm $D_2$ and by a third diaphragm $D_3$ made of the sleeve 33.

Diaphragms $D_1$, $D_2$ and $D_3$ have diameters which correspond with the diaphragming limit of the beams ($F_1$) issuing from the terminal face 8 of the light guide 3.

The chamber $E_1$ walls are blackened and dulled for example through coating with black and dull paint.

The conicity of the wall 34 is reciprocal of that of wall 32, and determined as well as the diameter of diaphragm $D_4$ and its distance from proximal face 9 of the guide 3, so that, on the one side, the solid angle under which the collector wall 1 is seen from the center of face 9 be as great of possible, and, on the other side, the said stray beams $F_2$ and $F_3$ be prevented from directly or indirectly reaching the objective 5.

Moreover, the structure of the sleeve 33 is such that its external face 35 is in shape of truncated cone in order that the maximum quantity of light be collected towards the guide 3; this face 35 is advantageously coated with a diffusing material such as white or metallized paint.

Finally, the light trap comprises further a spherical concave mirror 36 co-axial to the guide 3 and located on the internal face of the plug 2. This mirror 36 is centered to the center of the diaphragm $D_3$ and has a low reflection factor. The mirror 36 can, for example, be directly cut into the plug 2 and covered with a coating of absorbing and non-diffusing thin films; it can also be cut into a black anti-glare glass set in the plug 2.

It is to be noted that the mirror 36 fills the whole space between the guide 3 and the collector 1.

A simple survey of the FIG. 3 shows that stray rays $F_2$ directly issuing from the collector 1 are completely stopped by the sleeve 33. The rays $F_2$ can to the utmost reach the face 34 of the chamber $E_2$ but cannot reach the face 32.

The rays $F_3$ issuing indirectly from collector 1, which strike the objective, can only come from the face 32 due to the curvature of mirror 36 as shown in the FIG. 3. Now this face 32 is absorbing, and therefore the rays $F_3$ which can possibly fall on the objective 5, have an extremely low brightness.

Finally, rays $F_4$ which strike the objective 5 through vitreous reflection on the face 9 if the guide 3 can only come, in view of the curvature given to the face 9, from the face 34 which weakly reflects rays issuing from the absorbing face 32. Consequently, the stray rays $F_4$ are also almost completely eliminated.

It is to be noted that the diaphragm $D_2$ is not indispensable and can be suppressed, its function being to increase the efficiency of the system. Besides, several diaphragms analogous to $D_2$ can be provided for into the chamber $E_1$.

Figure 4:
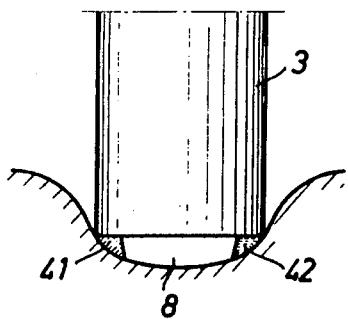
FIGS. 4 and 5 represent partially an endoscope according to the invention and intended for colorimetry.
Figure 5:
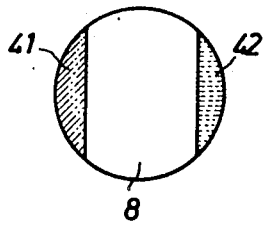

FIGS. 4 and 5 show the distal extremity of a light guide of a direct-vision endoscope of the type illustrated in FIG. 3.

This endoscope is especially equipped for colorimetry studies and, for this purpose, two colour samples 41, 42 in shape of sectors have been fastened symmetrically on the distal face 8 of the guide 3, for example by gluing onto said face 8. This is a particularly interesting application of the invention as, up to now, such a comparative study "in situ" was not possible with known endoscopes in view of stray beams. These samples 41 and 42 are made for example of paints or enamels of different colorations.

Figure 6:
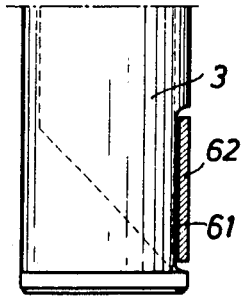
FIGS. 6 and 7 show partial illustrations of a lateral vision endoscope according to the invention and intended for inspecting surface conditions.
Figure 7:
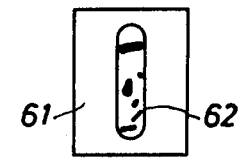

The FIGS. 6 and 7 show another possible application of the invention intended for a direct comparative study of surface conditions. The endoscope whose distal extremity of the light guide 3 has been illustrated, is a lateral-vision one and is provided on the viewing lateral face 61 with a surface condition standard 62.

The standard 62 can be, for example, a pellet glued on or engraved into the face 61; this comparative study "in situ" was also impossible with already known endoscopes for the same reasons given hereabove for colorimetry.

Obviously endoscopes according to the invention, either direct-vision or lateral-vision types, can be equipped for colorimetry or inspection of surface conditions in the manner hereabove described.

Finally, according to a further improvement of the endoscope of the invention, means can be provided for in case of lateral vision in order to appreciably attenuate some reflections which happen at the very level of the distal face of the light guide. A lateral vision endoscope is thus realized, giving an exceptional sharpness to the observed or photographed image, and an outstanding contrast between the image and the background which has an exceptionally low brightness. Said means (FIG. 8) provide on the one side, a flat facet 81 parallel with the axis of the guide 3 and meeting the bevelled extremity 82 of the guide 3 in an angle of 45°, and on the other side, frosting the parts 83 and 84 (represented by dotted areas on the FIG. 8) of the lateral surface of the guide between face 82 and facet 81. The facet 81 can be provided for on a portion or on the totality of the length of the guide 3; the stray light rays $F_5$ which would have a tendency to reflect on the face 82 and on the lateral portions 83 and 84 for coming back in the guide axis towards the objective of the endoscope (or the observer's eye) are thus strongly attenuated.

Besides, the reflections due to the viewing lateral cylindrical face, are suppressed thanks to the facet 81 which offers also the advantage of increasing the field depth owing to the suppression of astigmatism obtained by the cylindrical surface.

Furthermore, no diaphragmation of the proximal face of the guide takes place; as for the width of the viewing window made on the distal face, it will be selected according to the prime importance of the lateral field on the transverse field, or vice versa.

Figure 8:
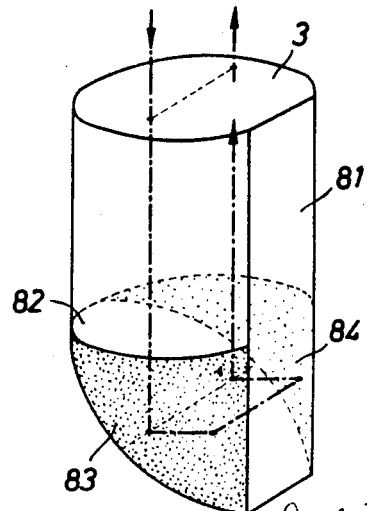
FIG. 8 is a partial perspective view of the terminal extremity of the light guide of an endoscope according to the invention.
Figure 9:
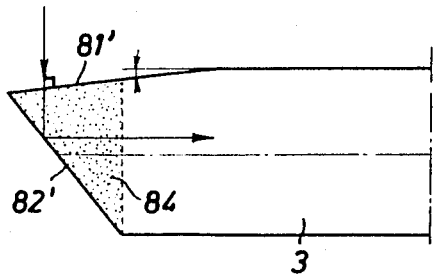
FIG. 9 illustrates a partial vertical section of a variant of the device shown in FIG. 8.

The FIG. 9 represents a modification of FIG. 8, where the facet 81' is slightly inclined to the axis of the guide 3, the bevelled face 82' being inclined correspondingly so that the rays perpendicular to the facet 81' be reflected by the face 82' in a parallel direction with the said guide axis.

The present invention is obviously not restricted to the types of embodiments described and illustrated hereabove, but, on the contrary, includes all modifications thereto within the scope of the appended claims.

What we claim is:

1. A contact endoscope comprising a light cylindrical hollow collector with a proximal and a distal extremity, made of transparent material with an external smooth surface and an internal frosted surface, a sight means fastened at the proximal extremity of said collector, a light guide coaxial to the said distal extremity of said collector and having a distal viewing face, an optical unit located in said hollow collector and consisting of a first and a second chamber co-axial to said light guide and limited each by a wall, the first chamber being substantially cylindrical with an absorbing wall and being limited at its proximal end by said sight and at its distal end by a first disphragm whose diameter matches that of the light beam issued from the light guide and diaphragmmed by the sight, and the second chamber being in the form of a truncated cone with a weakly reflecting wall, disposed between the light guide and the first chamber, and being limited at its proximal extremity by said first diaphragm, at the distal extremity of said second chamber a second diaphragm of a diameter greater than that of the first diaphragm, whereby said diameter of the second diaphragm as well as the distance from the second diaphragm to the proximal face of the light guide are defined in order to obtain the maximum illumination of the said proximal face by the light collector while preventing the direct rays issued by the collector to enter the first chamber, a third hollow chamber co-axial to the light guide, having a diffusing truncated cone wall whose conicity is inverse relatively to that of the second chamber, and connecting the second diaphragm to the collector, and a spherical concave mirror of low reflection factor, co-axial to the light guide, and limiting the internal wall of the collector extremity between this latter and the proximal face of the light guide.

2. Endoscope according to the claim 1, characterized in that said spherical mirror is centered to the diaphragm separating both chambers.

3. Endoscope according to claim 2, comprising a third diaphragm which divides the first chamber into two portions and is in alignment with the sight diaphragm and the diaphragm separating the first and second chambers.

4. Endoscope according to claim 1, in which samples corresponding to a condition to be surveyed are fastened on the distal viewing face of the light guide.

5. Endoscope according to claim 1, in which the distal extremity of the light guide is beveled for lateral vision and has a facet in parallel direction with the guide axis and meeting the bevelled face under an angle of 45°, the portions of the guide lateral surface between the bevelled face and the facet being frosted.

6. Endoscope according to claim 5, in which said facet is slightly inclined to the axis of the light guide and the said bevelled face is correspondingly inclined.

References Cited

FOREIGN PATENTS 1,113,164   11/1955   France _____ 350—96 R

DAVID H. RUBIN, Primary Examiner

U.S. Cl. X.R.

350—276 SL; 128—4